United States Patent
Wong et al.

(10) Patent No.: US 12,035,306 B2
(45) Date of Patent: Jul. 9, 2024

(54) COMMUNICATIONS DEVICE, INFRASTRUCTURE EQUIPMENT AND METHODS

(71) Applicant: Sony Corporation, Tokyo (JP)

(72) Inventors: Shin Horng Wong, Basingstoke (GB); Martin Warwick Beale, Basingstoke (GB); Kazuyuki Shimezawa, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 493 days.

(21) Appl. No.: 17/276,154

(22) PCT Filed: Sep. 26, 2019

(86) PCT No.: PCT/EP2019/076071
§ 371 (c)(1),
(2) Date: Mar. 15, 2021

(87) PCT Pub. No.: WO2020/064945
PCT Pub. Date: Apr. 2, 2020

(65) Prior Publication Data
US 2022/0039121 A1    Feb. 3, 2022

(30) Foreign Application Priority Data
Sep. 28, 2018 (EP) .................. 18197779.4

(51) Int. Cl.
*H04W 72/1268* (2023.01)
*H04W 24/08* (2009.01)
(Continued)

(52) U.S. Cl.
CPC ....... *H04W 72/1268* (2013.01); *H04W 24/08* (2013.01); *H04W 72/20* (2023.01); *H04W 72/23* (2023.01); *H04W 72/535* (2023.01)

(58) Field of Classification Search
CPC . H04W 72/1268; H04W 72/20; H04W 72/23; H04W 72/535; H04W 72/569;
(Continued)

(56) References Cited

U.S. PATENT DOCUMENTS 11,206,578 B2 * 12/2021 Agiwal ................. H04L 5/0064
2018/0035332 A1    2/2018 Agiwal
(Continued)

FOREIGN PATENT DOCUMENTS

CN    102892103 A    1/2013
CN    107666684 A    2/2018
(Continued)

OTHER PUBLICATIONS

Fujitsu, Discussion on uplink preemption indication, 3GPP TSG RAN WG1 #94bis, R1-1810597, Internet<URL: http://www.3gpp.org/ftp/tsg_ran/WG1_RL1/TSGR1_94b/Docs/R1-1810597.zip>, Sep. 28, 2018, Chengdu, China.
(Continued)

*Primary Examiner* — Jianye Wu
(74) *Attorney, Agent, or Firm* — XSENSUS LLP

(57) ABSTRACT

A communications device comprising a transmitter configured to transmit signals on communications resources of a wireless access interface of the wireless communications network, a receiver configured to receive signals transmitted on the communications resources of the wireless access interface, and a controller configured to control the transmitter and the receiver to transmit data representing the signals. The controller is configured to determine communications resources of the wireless access interface to be used to transmit the signals representing the data to be transmitted, and to determine a schedule for monitoring the wireless access interface to receive control information, wherein the monitoring schedule is based on the determined
(Continued)

communications resources to be used to transmit the data, and the control information is monitored for a pre-emption indication that at least a portion of the determined communications resources are allocated for transmitting signals by another communications device.

19 Claims, 11 Drawing Sheets

(51) Int. Cl.
*H04W 72/20* (2023.01)
*H04W 72/23* (2023.01)
*H04W 72/50* (2023.01)

(58) Field of Classification Search
CPC .... H04W 24/08; H04W 24/90; H04L 5/0037; H04L 5/0041; H04L 5/0091
See application file for complete search history.

(56) References Cited

U.S. PATENT DOCUMENTS

| | | | |
|---|---|---|---|
| 2018/0278454 A1 | 9/2018 | Islam | |
| 2021/0185718 A1* | 6/2021 | Ying | H04W 72/23 |

FOREIGN PATENT DOCUMENTS

| | | |
|---|---|---|
| WO | 2018/050431 A1 | 3/2018 |
| WO | 2018/228865 A1 | 12/2018 |

OTHER PUBLICATIONS

Sony, Considerations in UL Inter UE Pre-emption, 3GPP TSG RAN WG1 #94bis, R1-1810640 , Internet<URL: http://www.3gpp.org/ftp/tsg_ran/WG1_RL1/TSGR1_94b/Docs/R1-1810640.zip> , Sep. 28, 2018, Chengdu, China.
Zte, On Inter-UE multiplexing between eMBB and URLLC, 3GPP TSG RAN WG1 #94 R1-1808212 , Internet<URL: http://www.3gpp.org/ftp/tsg_ran/WG1_RL1/TSGR1_94/Docs/R1-1808212.zip> , Aug. 20, 2018, Gothenburg, Sweden.
International Search Report and Written Opinion dated Nov. 29, 2019, received for PCT Application PCT/EP2019/076071 Filed on Sep. 26, 2019, 10 pages.
Sony, "UL Inter-UE Pre-Emption", 3GPP TSG RAN WG1 Meeting #94, R1-1808344, Aug. 20-24, 2018, 5 pages.
Panasonic, "Discussion on URLLC UL Multiplexing", 3GPP TSG RAN WG1 Meeting #92bis, R1-1804642, Apr. 16-20, 2018, pp. 1-6.
VIVO, "Summary of Handling UL Multiplexing of Transmission With Different Reliability Requirements", 3GPP TSG RAN WG1 Meeting #92bis, R1-1805629, Apr. 16-20, 2018, 11 pages.
3GPP, "NR; NR and NG-RAN Overall Description; Stage 2(Release 15)", TS 38.300 V15.2.0, Jun. 2018, pp. 1-87.
Holma et al., "LTE for UMTS OFDMA and SC-FDMA Based Radio Access", John Wiley and Sons, 2009, pp. 25-27.
3GPP, "Study on Scenarios and Requirements for Next Generation Access Technologies (Release 14)", TR 38.913 V14.3.0, Jun. 2017, pp. 1-39.
3GPP, "NR; Multiplexing and Channel Coding", TS 38.212 V15.2.0, Jun. 2018, pp. 1-98.
VIVO, "Offline Discussion for UL Inter UE Tx Prioritization/Multiplexing", 3GPP TSG RAN WG1 Meeting #94, R1-1809995, Aug. 20-24, 2018, 5 pages.
NTT Docomo, Inc., "Revised WID on New Radio Access Technology", 3GPP TSG RAN Meeting #78, RP-172834, Dec. 18-21, 2017, 11 pages.
Ericsson, On Group-Common PDCCH, 3GPP TSG RAN WG1 #90b R1-1718629 , Internet<URL: http://www.3gpp.org/ftp/tsg_ran/WG1_RL1/TSGR1_90b/Docs/R1-1718629.zip> , Oct. 9, 2017.
Fujitsu, Discussion on uplink pre-emption indication, 3GPP TSG RAN WG1 #94 R1-1808302 , Internet<URL:http://www.3gpp.org/ftp/tsg_ran/WG1_RL1/TSGR1_94/Docs/R1-1808302.zip>, Aug. 20, 2018.
Fujitsu, On eMMB and URLL Multiplexing, 3GPP TSG RAN WG1 #91 R1-1719616, Internet<URL: http://www.3gpp.org/ftp/tsg_ran/WG1_RL1/TSGR1_91/Docs/R1-1719616.zip> , Nov. 27, 2017.
Qualcomm Incorporated, eMBB and URLLC dynamic multiplexing and preemption indication on the uplink, 3GPP TSG RAN WG1 #92b R1-1804820, Internet<URL: http://www.3gpp.org/ftp/tsg_ran/WG1_RL1/TSGR1_92b/Docs/R1-1804820.zip>, Apr. 16, 2018.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2019/076071, filed Sep. 26, 2019, which claims priority to EP 18197779.4, filed Sep. 28, 2018, the entire contents of each are incorporated herein by reference.

BACKGROUND

Field

The present disclosure relates to communications devices, infrastructure equipment and methods for the transmitting of data by a communications device in a wireless communications network. Embodiments of the present technique can provide an arrangement for more efficiently transmitting uplink data, when the transmission may be pre-empted by another transmission. Pre-emption therefore relates to an acquisition or requisition of communications resource previously allocated to a communications device for uplink data transmission.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected efficiently to support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

NR systems are expected to operate in a large range of frequencies and are expected to cover a broad range of use cases. Example use cases that are considered are:
Enhanced Mobile Broadband (eMBB)
Massive Machine Type Communications (mMTC)
Ultra Reliable & Low Latency Communications (URLLC)

eMBB services are typically high capacity services with a requirement to support up to 20 Gb/s. For efficient transmission of large amounts of data at high throughput, eMBB services are expected to use a long scheduling time so as to minimise the overhead, where scheduling time refers to the time available for data transmission between allocations. In other words, eMBB services are expected to have relatively infrequent allocation messages and to have longer time period allocated to data transmission in-between allocation messages.

Ultra Reliable Low Latency Communications (URLLC) services, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a communications device for use in a wireless communications network, the communications device comprising a transmitter configured to transmit signals on communications resources of a wireless access interface of the wireless communications network, a receiver configured to receive signals transmitted on the communications resources of the wireless access interface, and a controller configured to control the transmitter and the receiver to transmit data representing the signals. The controller is configured to determine communications resources of the wireless access interface to be used to transmit the signals representing the data to be transmitted, and to determine a schedule for monitoring the wireless access interface to receive control information. The monitoring schedule is based on the determined communications resources to be used to transmit the data, and the control information is monitored for a pre-emption indication that at least a portion of the determined communications resources are allocated for transmitting signals by another communications device. According to this arrangement the communications device is configured to monitor for a pre-emption indication at times such that it minimises redundant pre-emption indication monitoring occasions/attempts/effort For example, an alternative arrangement might be for the communications device to monitor for pre-emption indications as particular times during a time divided structure of the wireless access interface, such as each mini-slot of an NR/5G wireless access interface. By providing a schedule for monitoring for pre-emption indicators based on the communications resources of a time-divided structure, which a communications device is planning to use, the communications device can reduce a number of occasions in which it must detect whether a pre-emption indicator is transmitted. The other uplink data may be for a service requiring more stringent latency requirements such as a URLLC service. The communications device can therefore reduce monitoring effort (complexity) by only minimising the monitoring attempts/occasions/effort for the pre-emption indication.

According to example embodiment therefore the communications device can be configured to receive and to decode the signals representing the control information providing the pre-emption indicator in accordance with the control information monitoring schedule, and in accordance with the pre-emption indication, to adapt the transmitting of the data, for example by refraining from transmitting the signals representing the data at least during the portion of the communications resources allocated to another communications device.

Embodiments of the present technique, which further relate to infrastructure equipment, methods of operating communications devices and infrastructure equipment and circuitry for communications devices and infrastructure equipment, allow for efficient use of communications resources in satisfying varying requirements for different data types, while reducing complexity and processing requirements for communications devices.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
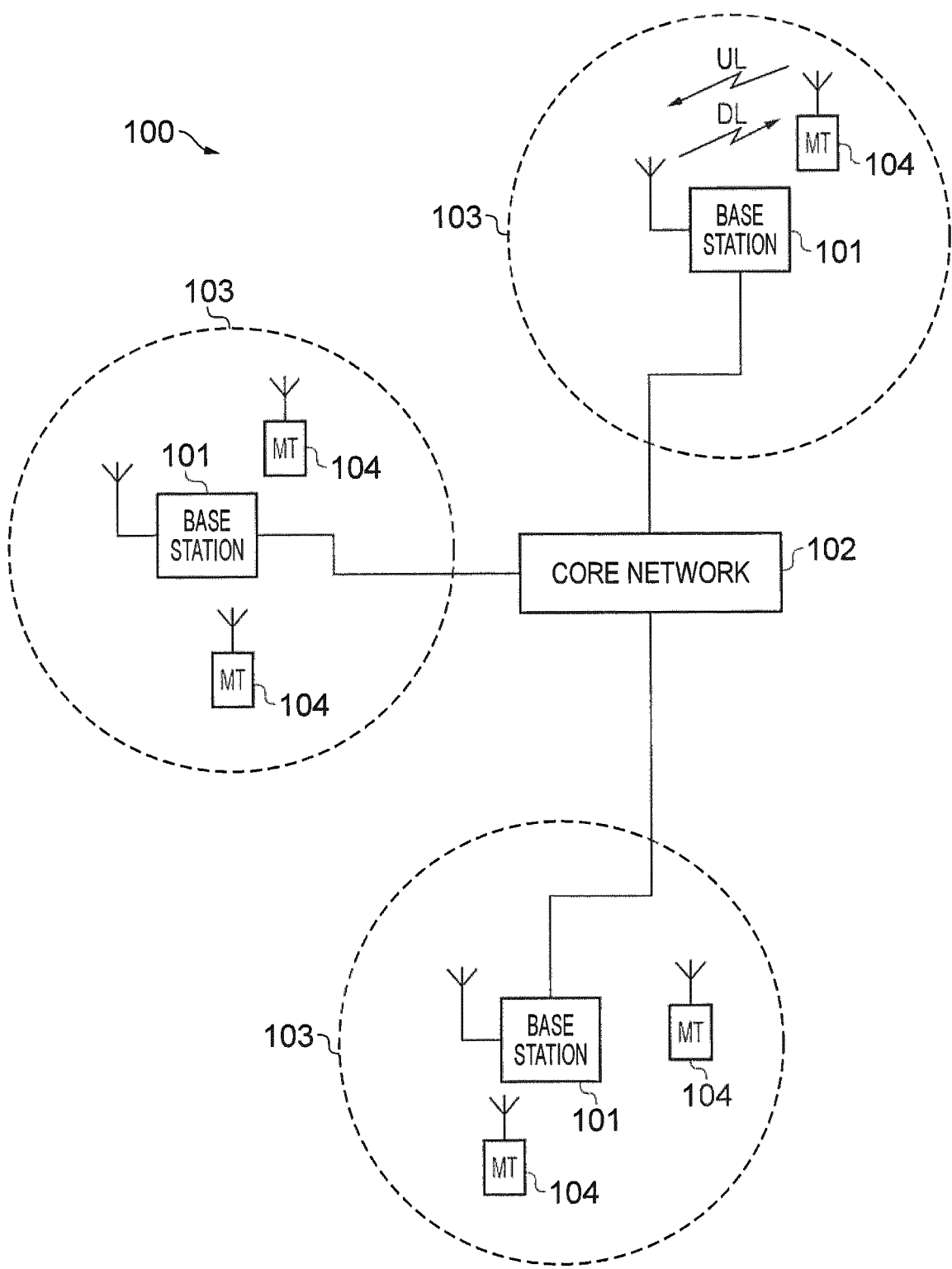
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104, and within which a communications device may obtain service. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
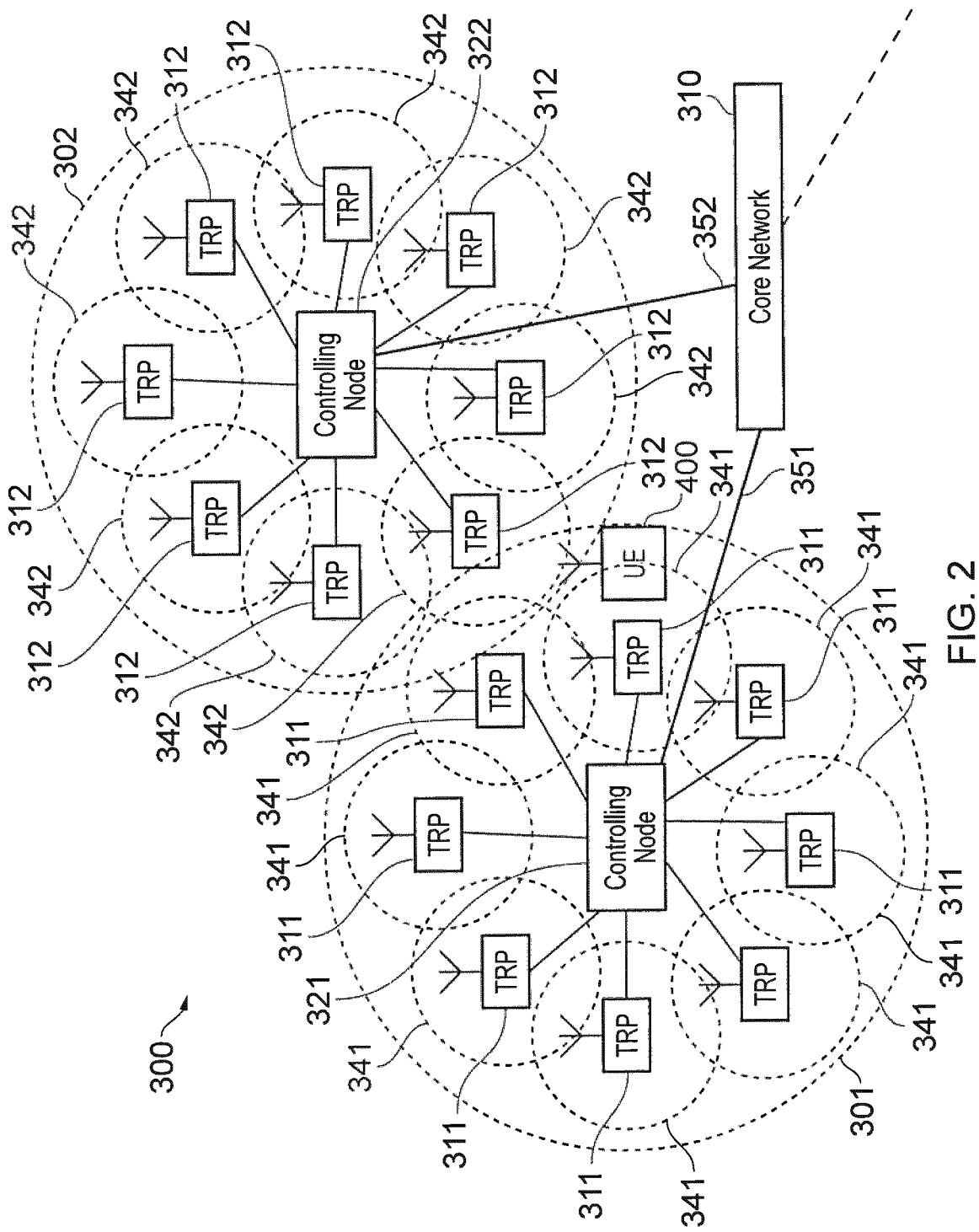
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for communications devices connected to the network. Each distributed unit 311, 312 has a coverage area (radio access footprint) 341, 342 which together define the coverage of the respective communication cells 301, 302. Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device 400 is represented in FIG. 2 within the coverage area of the first communication cell 301. This communications device 400 may thus exchange signalling with the first controlling node 321 in the first communication cell via one of the distributed units 311 associated with the first communication cell 301. In some cases communications for a given communications device are routed through only one of the distributed units, but it will be appreciated in some other implementations communications associated with a given communications device may be routed through more than one distributed unit, for example in a soft handover scenario and other scenarios.

The particular distributed unit(s) through which a communications device is currently connected through to the associated controlling node may be referred to as active distributed units for the communications device. Thus the active subset of distributed units for a communications device may comprise one or more than one distributed unit (TRP). The controlling node 321 is responsible for determining which of the distributed units 311 spanning the first communication cell 301 is responsible for radio communications with the communications device 400 at any given time (i.e. which of the distributed units are currently active distributed units for the communications device). Typically this will be based on measurements of radio channel conditions between the communications device 400 and respective ones of the distributed units 311. In this regard, it will be appreciated that the subset of the distributed units in a cell which are currently active for a communications device will depend, at least in part, on the location of the communications device within the cell (since this contributes significantly to the radio channel conditions that exist between the communications device and respective ones of the distributed units).

In at least some implementations the involvement of the distributed units in routing communications from the communications device to a controlling node (controlling unit) is transparent to the communications device 400. That is to say, in some cases the communications device may not be aware of which distributed unit is responsible for routing communications between the communications device 400 and the controlling node 321 of the communication cell 301 in which the communications device is currently operating, or even if any distributed units 311 are connected to the controlling node 321 and involved in the routing of communications at all. In such cases, as far as the communications device is concerned, it simply transmits uplink data to the controlling node 321 and receives downlink data from the controlling node 321 and the communications device has no awareness of the involvement of the distributed units 311, though may be aware of radio configurations transmitted by distributed units 311. However, in other embodiments, a communications device may be aware of which distributed unit(s) are involved in its communications. Switching and scheduling of the one or more distributed units may be done at the network controlling node based on measurements by the distributed units of the communications device uplink signal or measurements taken by the communications device and reported to the controlling node via one or more distributed units.

In the example of FIG. 2, two communication cells 301, 302 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

The elements of the wireless access network shown in FIG. 1 may be equally applied to a 5G new RAT configuration, except that a change in terminology may be applied as mentioned above.

The embodiments of the present invention can find application with advanced wireless communications systems such as those referred to as 5G or New Radio (NR) Access Technology.

Figure 3:
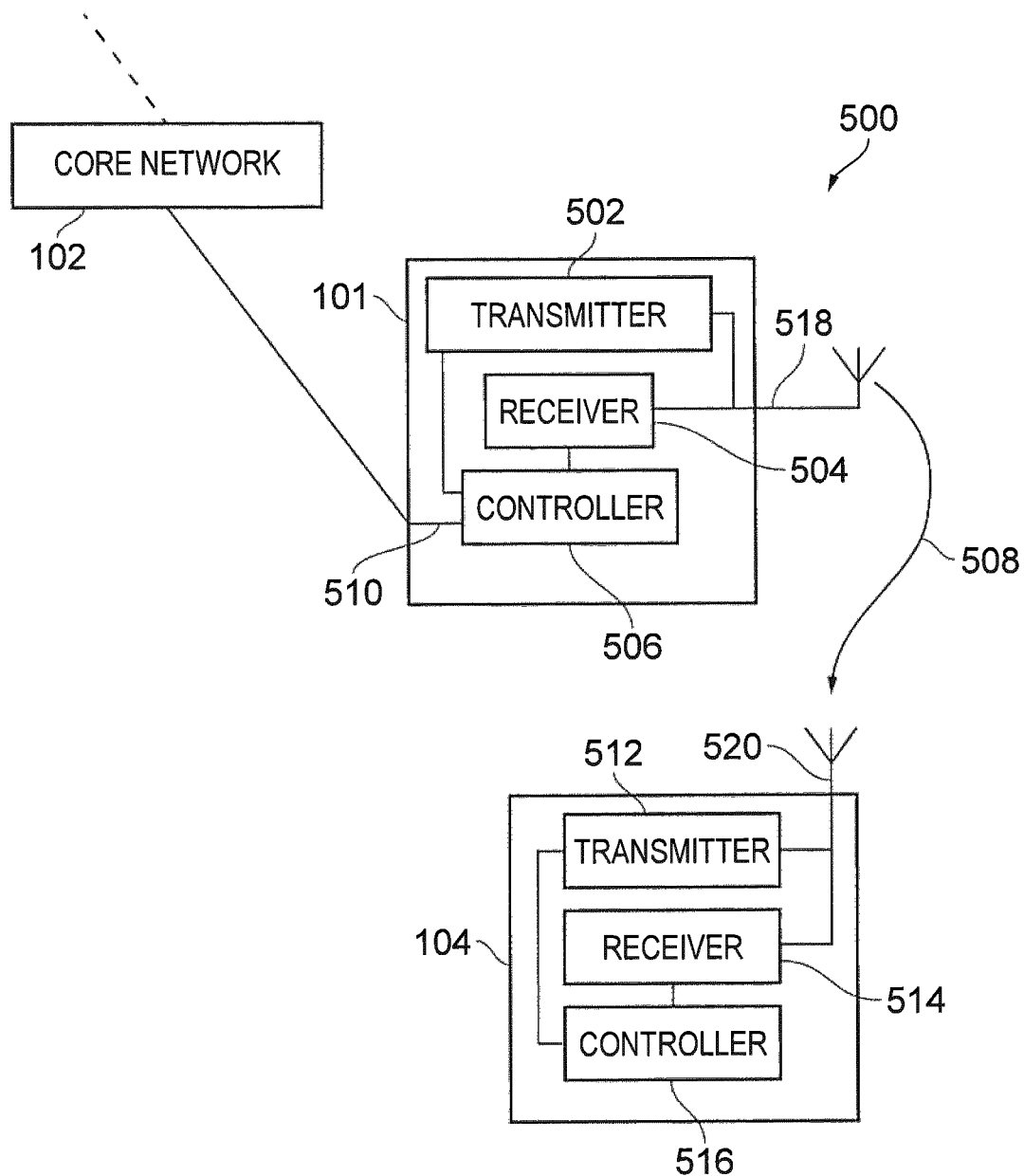
FIG. 3 schematically shows a telecommunications system according to an embodiment of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part 102 coupled to a radio network part. The radio network part comprises the infrastructure equipment (which may be an evolved-nodeB) 101 coupled, via a wireless access interface illustrated generally by arrow 508, to a communications device 104, which may also be referred to as terminal devices. It will of course be appreciated that in practice the radio network part may comprise a plurality of base stations serving a larger number of communications devices across various communication cells. However, only a single infrastructure equipment and single communications device are shown in FIG. 3 in the interests of simplicity.

As noted above, the operation of the various elements of the communications system 500 shown in FIG. 3 may be broadly conventional apart from where modified to provide functionality in accordance with embodiments of the present disclosure as discussed herein.

The infrastructure equipment 101 is connected to the core network 102 via an interface 510 to a controller 506. The infrastructure equipment 101 includes a receiver 504 connected to an antenna 518 and a transmitter 502 connected to the antenna 518. The receiver 504 and the transmitter 502 are both connected to the controller 506. The controller 506 is configured to control the infrastructure equipment 101 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 506 may comprise circuitry which is suitably configured/programmed to provide the desired functionality using conventional programming/configuration techniques for equipment in wireless telecommunications systems. The transmitter 502, receiver 504 and controller 506 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the communications device 104 includes a controller 516 connected to a receiver 514 which receives signals from an antenna 520. The controller 516 is also connected to a transmitter 512 which is also connected to the antenna 520. The controller 516 is configured to control the communications device 104 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 516 may comprise circuitry which is suitably configured/programmed to provide the desired functionality using conventional programming/configuration techniques for equipment in wireless telecommunications systems. The transmitter 512, receiver 514 and controller 516 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s.

In order to ensure efficient use of communications resources when transmitting data associated with eMBB services, individual transmissions of such data may use a large amount of communications resources and as such may extend in duration for a relatively long period. (For example, a single data transmission may extend over multiple time slots of a time-divided wireless access interface).

The requirements for Ultra Reliable & Low Latency Communications (URLLC) [1] services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher.

Where the wireless access interface uses orthogonal frequency division multiplexing (OFDM) in combination with time division multiple access, the communications resources associated with the wireless access interface may be divided based on OFDM symbol periods. A pre-determined number (e.g. 14) of ODFM symbol periods may comprise a time slot.

Since URLLC data is intolerant to latency, URLLC data transmission can occupy (that is, be transmitted using) a subset of the resources that have been previously allocated for an eMBB data transmission. This may be referred to as 'pre-emption'.

However, it remains a problem to provide efficient techniques to support pre-emption in respect of uplink transmissions.

According to the example embodiments, there is provided a communications device for use in a wireless communications network, the communications device comprising a transmitter configured to transmit signals on communications resources of a wireless access interface of the wireless communications network, a receiver configured to receive signals transmitted on the communications resources of the wireless access interface, and a controller configured to control the transmitter and the receiver to transmit data representing the signals. The controller is configured to determine communications resources of the wireless access interface to be used to transmit the signals representing the data to be transmitted, and to determine a schedule for monitoring the wireless access interface to receive control information. The monitoring schedule is based on the determined communications resources to be used to transmit the data, and the control information is monitored for a pre-emption indication indicating that at least a portion of the determined communications resources are allocated for transmitting signals by another communications device. The communications device may therefore receive the control information in accordance with the control information monitoring schedule, and in accordance with a pre-emption indication included with the control information, adapt the transmission of the uplink data, for example by not transmitting the data during at least a portion of the communications resources pre-empted by another source such as another UE or adapting the modulation and coding for transmitting the data to compensate for the loss of these communications resources.

Uplink Pre-emption

Uplink pre-emption, in which a portion of communications resources allocated for a first transmission of data are subsequently allocated for a second transmission of data by for example another communications device can present particular difficulties, because the first and second transmissions may be performed by different devices.

This is in contrast to downlink pre-emption, where the infrastructure equipment 101 determines that pre-emption is to be carried out and controls the transmission of both the pre-empted data (e.g. eMBB data) and pre-empting data (e.g. URLLC data). As such, in response to determining that downlink pre-emption is to occur, the infrastructure equipment is able to control its transmitter to ensure that both pre-empted and pre-empting transmissions do not use a same set of communications resources.

However, there is clearly a need to ensure that the transmission of pre-empted data transmission does not overlap (that is, use the same communications resources as) the transmission of the pre-empting data transmission. This is because otherwise it may be difficult, if not impossible, for the infrastructure equipment to successfully decode the pre-empting data transmission. Noting that the pre-empting data transmission may be associated with a very high reliability of transmission requirement, it is therefore essential that the communications device which is allocated the communications resources for transmitting the pre-empted data reliably adjusts its transmission in order to avoid any overlap with the transmission of the pre-empting data.

Figure 4:
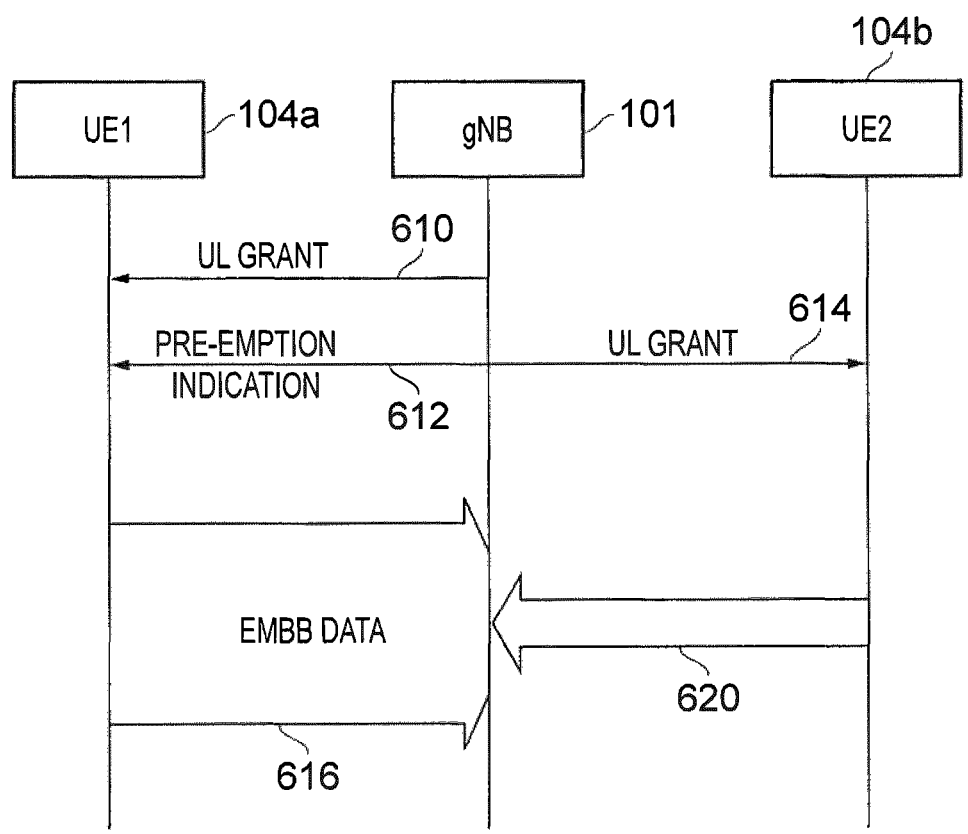
FIG. 4 illustrates diagrammatically communications devices and infrastructure equipment and a sequence of transmissions associated with uplink pre-emption, which may be in accordance with embodiments of the present disclosure.

FIG. 4 illustrates diagrammatically first and second communications devices 104a, 104b and the infrastructure equipment 101 and a sequence of transmissions associated with uplink pre-emption, which may be in accordance with embodiments of the present disclosure.

First, the infrastructure equipment 101 may transmit a first uplink allocation indication 610 indicating uplink communications resources for the use of the first communications device 104a. The grant (that is, the allocation) of the uplink communications resources for both data transmissions may use essentially conventional techniques. These techniques may include grant-based allocation, in which communications resources are explicitly allocated, for example by using downlink control information (DCI) transmitted by the infrastructure equipment. These techniques also include grant free resource allocation, where communications resources are semi-statically configured for the use of one or more communications devices, and may be used by one or more of the communications devices without any explicit grant.

The first communications device 104a may prepare for an uplink data transmission 616 using the allocated resources. This preparation may be in response to receiving the first uplink allocation indication 610 and/or in response to a determination that the uplink data was available to send, for example, where the first uplink allocation indication 610 was received prior to the determination that the uplink data was available to send.

After transmitting the first uplink allocation indication 610, the infrastructure equipment 101 determines that a low latency data transmission by the second communications device 104b should pre-empt the uplink transmission of the first communications device 104a using some or all of the communications resources which the first communications device 104a was intending to use for the uplink data transmission 616.

In response to determining that pre-emption should occur, the infrastructure equipment 101 transmits a pre-emption indication (PI) 612 to the first communications device 104a, and a second uplink allocation indication 614, which may be an uplink grant, to the second communications device 104b.

The second uplink allocation indication 614 indicates uplink communications resources which include some or all of the uplink communications resources which the first communications device 104a was intending to use for the uplink data transmission 616.

In response to receiving the second uplink allocation indication 614, the second communications device 104b transmits, using communications resources indicated by the second uplink allocation indication 614, the low latency uplink data 620.

As described above, the low latency uplink data 620 may be for example URLLC data having a high transmission reliability requirement. Were the second communications device 104a to transmit the uplink data transmission 616 without modification, the probability of successful reception of the low latency uplink data 620 by the infrastructure equipment 101 may be highly unlikely to satisfy the reliability requirements for the low latency uplink data 620.

The PI 612 may therefore indicate to the first communications device 104a that pre-emption will occur in respect of its upcoming uplink data transmission 616. In response to receiving the PI 612, the first communications device 104a may modify its transmission, for example, by cancelling the entire transmission.

The PI 612 may indicate a time period or range of communications resources and the first communications device may, in response to receiving the PI 612, refrain from transmitting using the indicated communications resources or during the indicated time period.

In some embodiments, the PI 612 may comprise an indication that the uplink data transmission 616 is to be rescheduled, and the first communications device 104a may thus, in response, carry out the uplink data transmission 616 according to the rescheduling indication in the PI 612.

In some embodiments of the present technique, the PI 612 and the second uplink allocation indication 614 may be transmitted substantially simultaneously, such as, for example, during a same period comprising one or more OFDM symbol.

In conventional techniques for notifying a downlink preemption event, the pre-emption indication may be sent after the pre-emption has occurred. However, it should be noted that the PI 612, indicating uplink pre-emption to the first communications device 104a, must be transmitted prior to the uplink data transmission 614 which is pre-empting the uplink data transmission from the first communications device, in order to ensure that no interference arising from a transmission by the first communications device 104a affects the reception of the low latency data 620 by the infrastructure equipment 101.

In order to provide uplink communications resources which can satisfy a low latency requirement associated with e.g. URLLC data, it is expected that URLLC data may be scheduled with a granularity of less than one slot, for example, with a granularity of two OFDM symbol periods. As a result, a communications device (such as the second communications device 104b) having URLLC data for transmission may be required to monitor the wireless access interface with a high frequency in order to determine whether, and if so, when, uplink communications resources have been allocated to it for the uplink transmission of the URLLC data.

In contrast, due to the longer transmission times for eMBB data, communications devices having eMBB data (such as the first communications device 104a) may be required to monitor for uplink resource allocations at a lower periodicity, such as once every slot.

From the above, and noting that the PI 612 may be sent substantially at the same time as the second uplink allocation 614, it may be appreciated that it may be necessary for the first communications device 104a to monitor the wireless access interface (in order to receive any PI) with the same periodicity with which the second communications device 104b is required to monitor the wireless access interface (in order to receive any uplink allocation).

Similarly, in order to satisfy the reliability requirement for data transmitted by the second communications device 104b, the first communications device 104a must receive the PI 612 with the same level of reliability in order to ensure that the pre-emption is effective.

This may imply significant capability and complexity for the first communications device 104a, even if the first communications device 104a is not otherwise capable of transmitting low latency data such as URLLC data.

There is thus a desire to minimize the impact of the use of uplink pre-emption on devices whose transmissions may be subject to such pre-emption.

In accordance with some embodiments, there may be a time period associated with each PI, such as the PI 612 shown in FIG. 4. This time period may be referred to as an impact period.

The start of the impact period may be determined based on a predefined, specified, standardised (predetermined) processing time for the first communications device 104a to receive and decode the PI 612 and, in response, to adapt the uplink data transmission 616. This predetermined processing time may be referred to as $N_{PI}$. The impact period is therefore a duration for which the UE1 104a must detect and decode the PI before it can suspend its uplink transmissions in favour of the second UE2 104b to transmit its low latency data. The UE1 104a can implement a shorter processing time to reduce the impact period, but the network may expect that the UE1 104a is able to process the PI in at least this defined time, so the impact period may be a minimum time for the network, but the UE needs this time to process the PI.

Specifically, for a given PI 612, the impact period may start at the time $N_{PI}$ after the end of the transmission of the PI 612; this reflects the fact that the PI 612 cannot be used to enable any pre-emption by low latency uplink data which occurs before this time.

The end of the impact period may be determined based on a predefined/specified/standardised time required for the second communications device 104b to receive and decode the uplink grant 614 and, in response, to begin transmission of the low latency uplink data 620. This minimum time may be referred to as $N_2$. Specifically, for a given PI 612, the impact period may end at the earliest time which is $N_2$ after the end of the uplink grant 614, where the uplink grant 614 is transmitted after the PI 612.

In some embodiments, a PI indicating that pre-emption is to occur may indicate that the pre-emption is to occur within the impact period associated with the PI.

Figure 5:
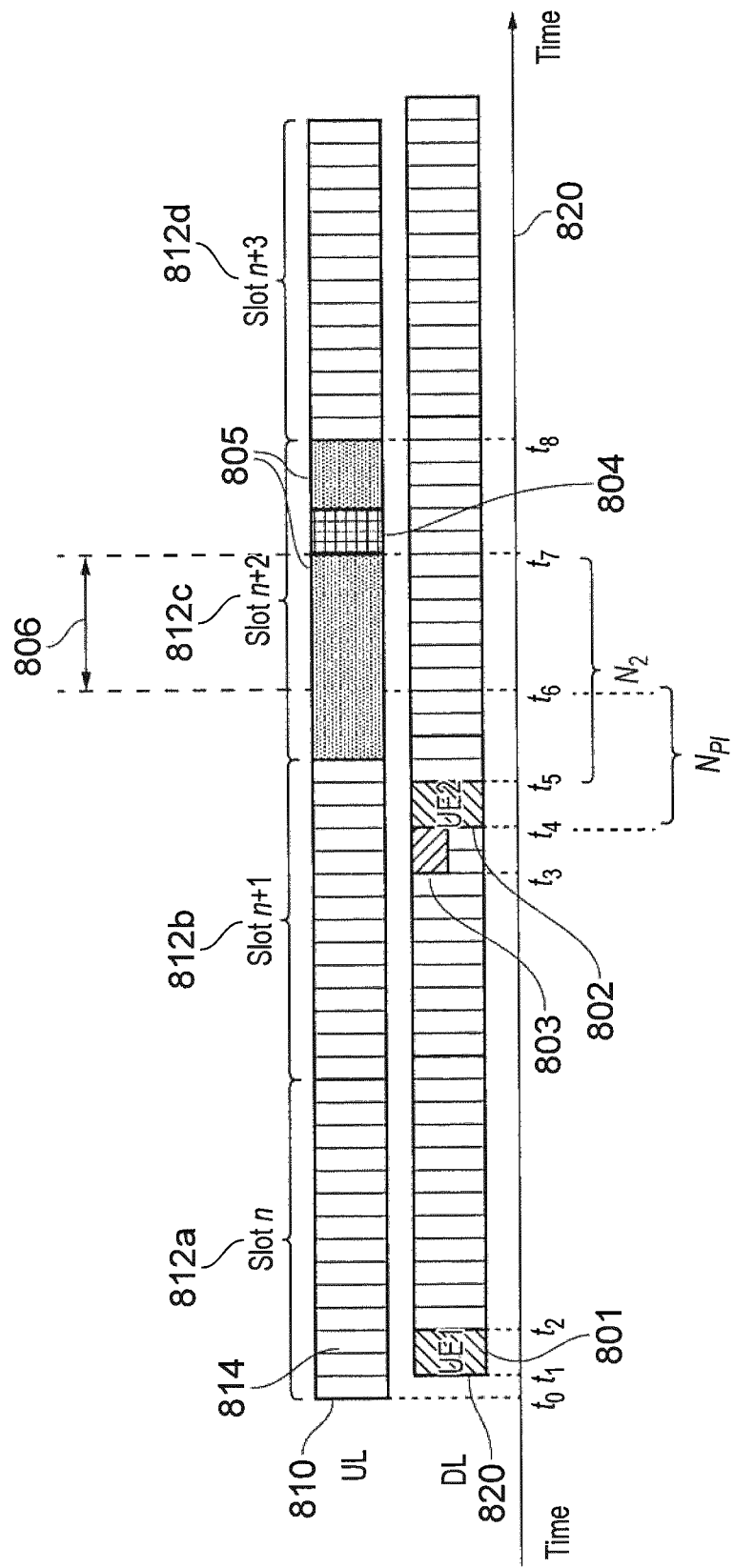
FIG. 5 shows an impact period determined in respect of a pre-emption indication in accordance with embodiments of the present disclosure.

FIG. 5 shows an impact period determined in respect of a pre-emption indication in accordance with embodiments of the present disclosure.

FIG. 5 shows uplink communications resources 810 and downlink communications resource 820 during a time period, with the progression of time indicated by the arrow 820. The uplink communications resources 810 and the downlink communications resource 820 are sub-divided in time into time slots 812a, 812b, 812c, 812d. Each of the time slots are further divided into OFDM symbol periods 814.

The time boundaries of uplink time slots and downlink time slots are shown as offset in order to compensate for propagation delay and the use of a timing advance, whereby at a communications device, uplink transmissions are advanced in time relative to the received downlink signals, in order to ensure that at the infrastructure equipment 101, uplink and downlink signals are time-aligned.

In FIG. 5, a first uplink allocation indication 801 is transmitted by the infrastructure equipment 101 to the first communications device 104a from time t1 to t2 to allocate uplink communications resources 805 (for the duration of the slot n+2 812c) for an eMBB data transmission, and broadly corresponds to the first uplink allocation indication 610 of FIG. 4. A pre-emption indication (PI) 803 transmitted by the infrastructure equipment 101 to the first communications device 104a from time t3 to t4 broadly corresponds to the PI 616 of FIG. 4.

A low latency uplink grant indication 802 is shown, transmitted by the infrastructure equipment 101 to the second communications device 104b from t4 to t5, and thus after the transmission of the PI 803. The low latency uplink grant indication 802 allocates uplink communications resources 804 to the second communications device 104b for the transmission of URLLC data starting at time t7.

Because the low latency uplink grant indication 802 is transmitted after the transmission of the PI 803, the corresponding uplink resource allocation 804 does not fall within the impact period of the PI 803. Rather, in accordance with the characterisation of the impact period described above, the impact period 806 of the PI 803 extends from time t6 (i.e. $N_{PI}$ after the end of the transmission of the PI 803) until time t7 (the earliest start time for communications resources that can be allocated by an uplink grant which is sent after the PI 803).

In some embodiments of the present disclosure, the first communications device 104a determines a schedule for monitoring downlink communications resources for PI transmissions. That is, rather than continuously attempt to determine whether a PI has been transmitted and/or whether a pre-emption is indicated by a transmitted PI, the first communications device 104a may selectively perform PI detection to decode received signals for the purpose of determining whether a PI has been transmitted and/or whether a pre-emption is indicated by a transmitted PI. This selective decoding may be performed in accordance with the determined monitoring schedule, according to which only signals received during certain time periods are used for PI detection. That is to say that the UE uses the monitoring schedule to determine the times at which it should try to detect a PI. The monitoring schedule is configured by the wireless communications network and provides a schedule of a possible time of transmission of the PIs.

The first communications device 104a may determine the monitoring schedule by receiving an indication of one or more parameters characterising the monitoring schedule from the infrastructure equipment 101. Alternatively or additionally, the first communications device 104a may determine the schedule by receiving an indication of one or more parameters from which the monitoring period may be calculated.

In some embodiments, the first communications device 104a calculates impact periods associated with one or more PI instances which are candidates for inclusion in the monitoring schedule.

The monitoring schedule may comprise a monitoring start time, which is a time prior to which no PI detection occurs in accordance with the schedule. The monitoring start time may be determined based on a start time of the allocated uplink communications resources 805 and the parameter $N_{PI}$. The monitoring start time may be the latest time at which a transmission of a PI may begin, where the impact period associated with that PI begins no later than (and preferably, at the same time as) the start of the allocated uplink communications resources 805. The monitoring start time may be determined as $$T_{PUSCH\_START} - N_{PI} - T_{PI},$$

where $T_{PI}$ is the transmission duration of a PI, and $T_{PUSCH\_START}$ is the time at which the uplink communications resources 810 start.

The monitoring schedule may comprise a monitoring end time, which is a time after which no PI detection occurs in accordance with the monitoring schedule. The monitoring end time may be determined based on an end time of the allocated uplink communications resources 805 and the parameter $N_2$. The monitoring end time may be the earliest time at which a transmission of a PI may end, where the impact period associated with that PI ends no later than (and preferably, at the same time as) the end of the allocated uplink communications resources 805. The monitoring end time may be determined as:

$$T_{PUSCH\_END} - N_2 - T_{DCI},$$

where $T_{DCI}$ is the transmission duration of an uplink grant for low latency communications resources, and $T_{PUSCH\_END}$ is the time at which the uplink communications resources 810 end. In some embodiments, the monitoring end time may be determined as:

$$T_{PUSCH\_END} - N_2.$$

Figure 6:
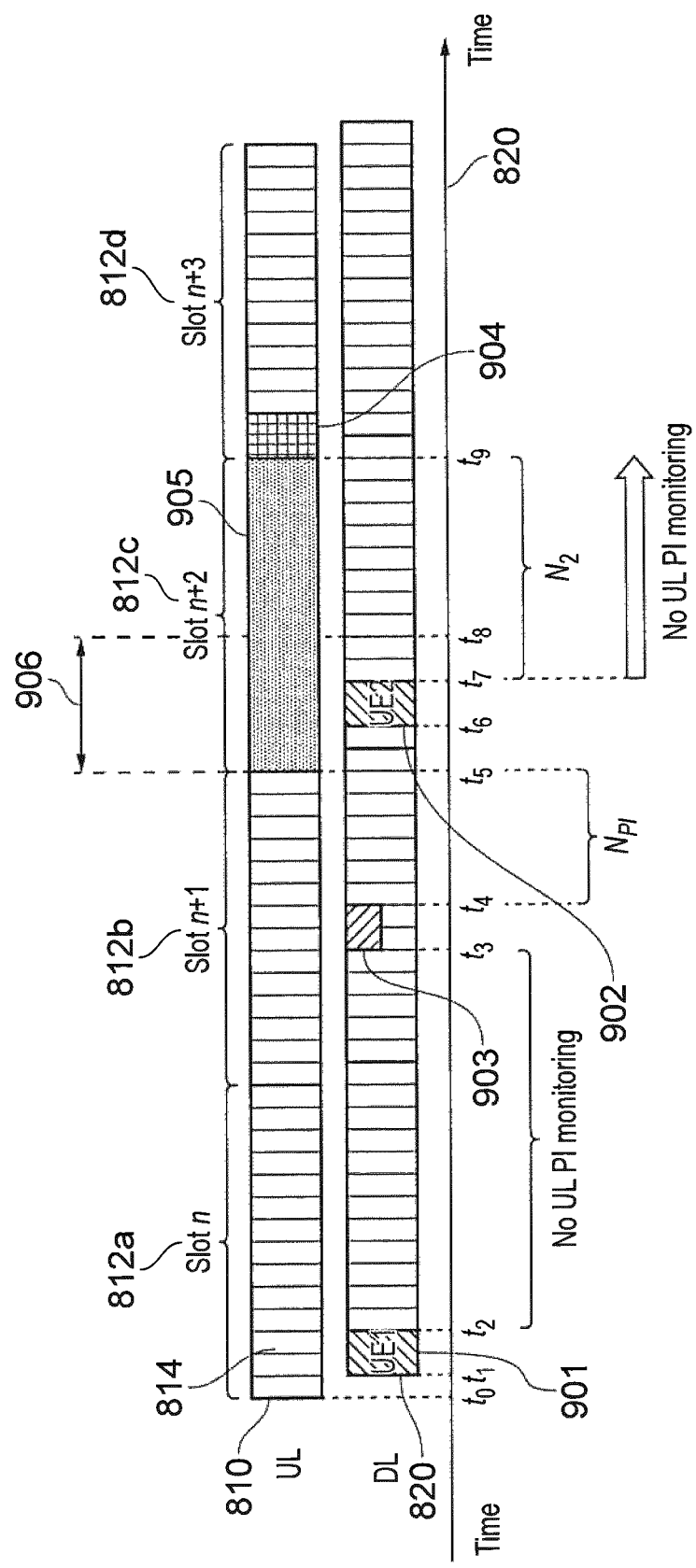
FIG. 6 shows a monitoring start time and a monitoring end time for monitoring PI instances associated with allocated uplink communications resources in accordance with embodiments of the present disclosure.

FIG. 6 shows a monitoring start time and a monitoring end time for monitoring PI instances associated with allocated uplink communications resources in accordance with embodiments of the present disclosure.

In FIGS. 6 to 10, features which have been previously described in respect of FIG. 5 are labelled with the same reference numerals and their description will not be repeated for brevity.

Features which appear in two or more of FIGS. 5 to 10 and whose reference numerals differ by an integral number of 100's may refer broadly to the same feature, or to different instances of a feature have a broadly similar function. For example, reference numerals 806, 906, 1006, etc. refer to impact periods, while reference numerals 803, 903, 1003a-e, etc. refer to PI instances and reference numerals 801, 901, etc. are used to denote indications of a grant of uplink communications for e.g. eMBB data transmission by the first communications device 104a.

In FIG. 6, the allocated uplink communications resources 905 start at time t5 and finish at time t9.

The latest time at which a PI 903 can be transmitted such that its impact period includes the beginning of the uplink communications resources 905 is from t3 to t4, where $t4 = t5 - N_{PI}$; accordingly, the monitoring start time may be set to t3.

The latest time at which a PI (not shown) can be transmitted such that its impact period includes the end of the uplink communications resources 905 is from t5 to t6, where $t5 = t9 - N_2 - T_{DCI}$; accordingly, the monitoring start time may be set to t5.

Alternatively, in accordance with some embodiments of the present disclosure, the monitoring start time may be set to t6 (where $t6 = t9 - N_2$).

Conventionally, a communications device whose transmissions may be pre-empted may be required to monitor for PIs at a frequency corresponding to the frequency with which opportunities for the infrastructure equipment to transmit communications resource allocations to the pre-empting communications device arise. For example, if the infrastructure equipment may transmit an uplink grant to allocate resources for URLLC data transmission starting at any mini-slot (where a mini-slot comprises two OFDM symbol periods), then another communications device whose transmission may be pre-empted may be required to monitor for PIs every mini-slot.

In accordance with embodiments of the present technique, the monitoring schedule may comprise a monitoring periodicity, which is a time period between the start of consecutive PI monitoring instances.

In accordance with embodiments of the present technique, the monitoring periodicity may be determined based on a duration of the impact periods of each of the PIs. In some embodiments, the periodicity may be determined as:

$$N_2 - N_{PI} + TU\text{-}DCI,$$

where TU_DCI is a duration of transmission of an uplink grant for communications resources for a transmission of low latency data, such as the second uplink allocation indication 614.

Figure 7:
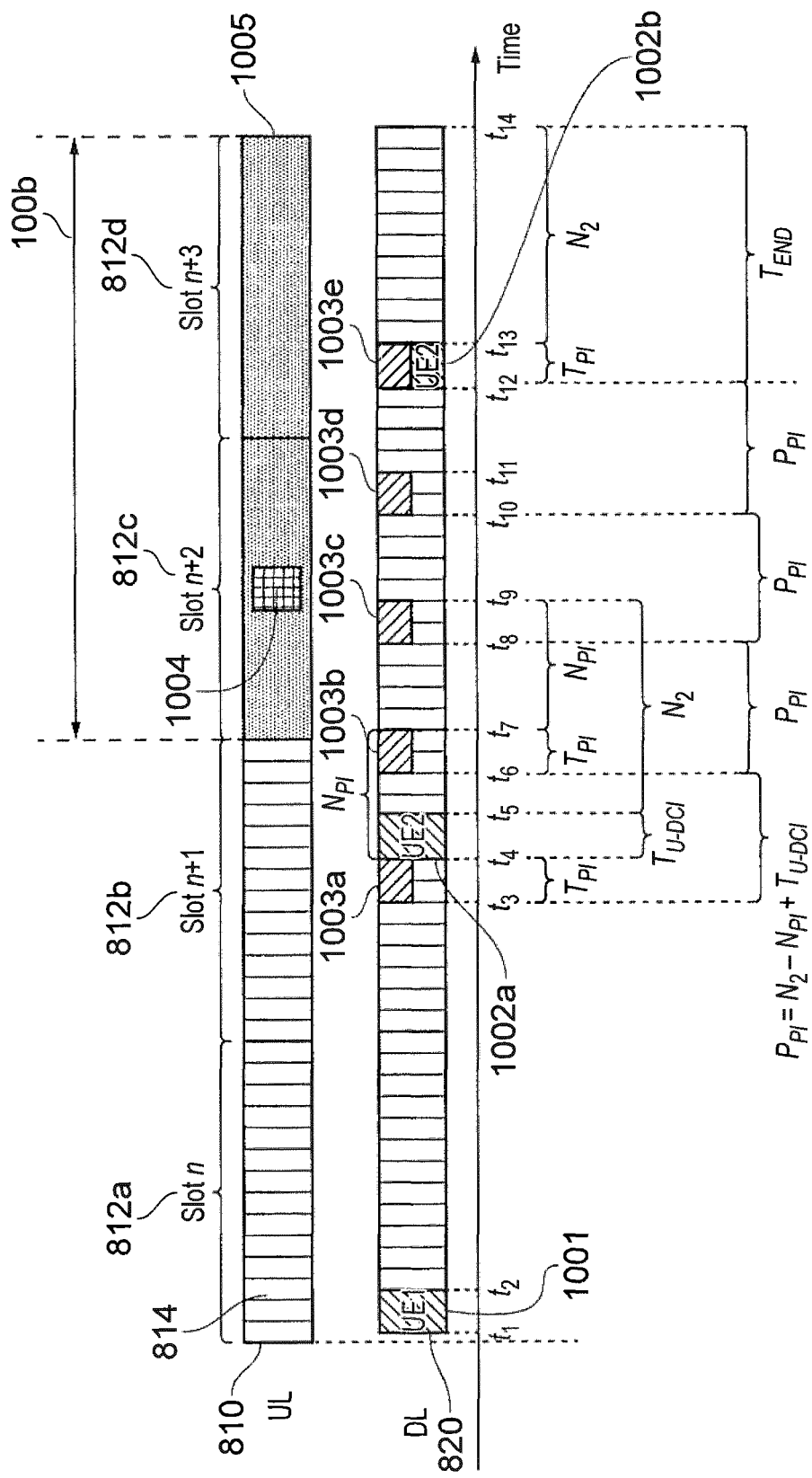
FIG. 7 shows a monitoring start time, a monitoring end time and a monitoring periodicity for monitoring PI instances in accordance with embodiments of the present disclosure.

FIG. 7 shows a monitoring start time, a monitoring end time and a monitoring periodicity for monitoring PI instances in accordance with embodiments of the present disclosure.

Uplink communications resources 1005 are allocated for the transmission of uplink data by the first communications device 104a and extend for the duration of slot n+2 812c and slot n+3 812d, starting from time t7 and ending at time t14, as indicated by the double-headed arrow 1006.

In FIG. 7, the monitoring start time is determined to be t3 (based on $t3=t7-N_{PI}$), and the monitoring end time is determined to be t13 (where $t13=t14-N_2$).

Preferably, the monitoring periodicity PPI is determined such that collectively, the impact periods associated with each of the monitored PI instances include all the uplink communications resources 1005.

Preferably, the monitoring periodicity PPI is determined to be maximised subject to the constraint that collectively, the impact periods associated with each of the monitored PI instances include all the uplink communications resources 1005.

The monitoring periodicity PPI may be determined as:

$$N_2-N_{PI}+TU\text{-}DCI.$$

In the example of FIG. 7, $N_2=10$ OFDM symbols, $N_{PI}=6$ OFDM symbols and TU-DCI=2 OFDM symbols. Accordingly, the monitoring periodicity=6 OFDM symbols.

Accordingly, the monitoring schedule provides for PI monitoring instances 1003a, 1003b, 1003c, 1003d and 1003e, whose start times are separated by PPI=6 OFDM symbols.

Also shown in FIG. 7 is a transmission of URLLC data using low latency communications resources 1004 by the second communications device 104b. The low latency communications resources 1004 are allocated to the second communications device 104b by means of an uplink grant 1002a, transmitted between t4 and t5.

Because the low latency communications resources 1004 fall within the impact period of at least one monitored PI, it is possible for the first communications device 104a to determine that a portion of the communications resources 1005 are to be pre-empted.

More specifically, the impact period of the second PI monitoring instance 1003b (which starts at t9) spans the low latency communications resources 1004. Therefore, the infrastructure equipment 101 may indicate, and the first communications device 104a may determine, by means of a PI transmitted at the second monitoring instance 1003b, that a portion of the impact period associated with that PI is to be pre-empted.

As will be appreciated, depending on the duration of the impact periods associated with PI instances, a monitoring schedule may be determined in accordance with embodiments of the present technique in which the monitoring periodicity may be longer than would be required conventionally.

As described above, in some embodiments, the monitoring schedule may be determined in accordance with the impact periods associated with the PIs such that collectively, the impact periods associated with the monitored PIs cover the entire time period corresponding to the allocated uplink communications resources.

In some embodiments, on the other hand, the monitoring schedule may be such that one or more portions of the time period corresponding to the allocated uplink communications resources does not correspond to an impact period of any monitored PI.

Figure 8:
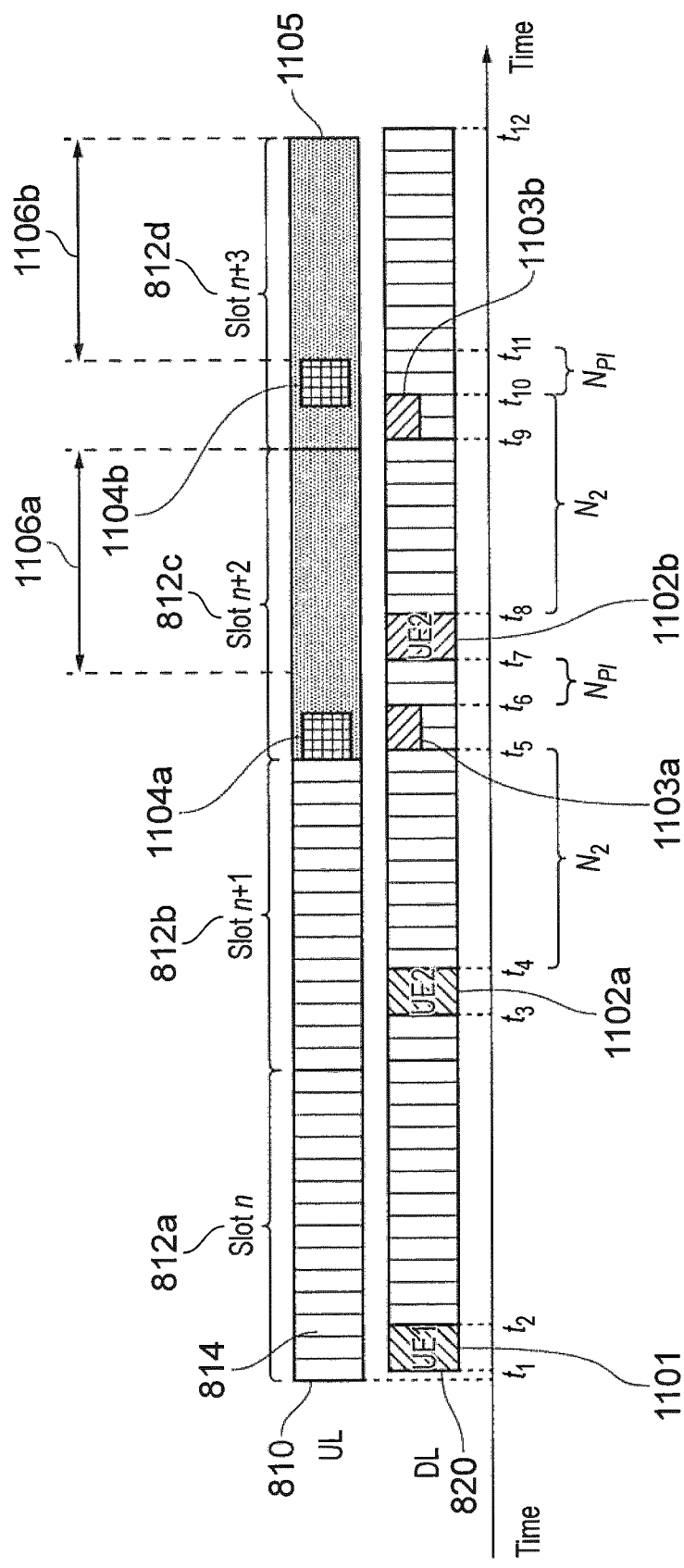
FIG. 8 illustrates a monitoring schedule for pre-emption indications in accordance with embodiments of the present disclosure.

FIG. 8 illustrates a monitoring schedule for pre-emption indications in accordance with embodiments of the present disclosure.

According to the monitoring schedule in the example of FIG. 8, the first communications device 104a, which has been allocated uplink communications resources 1105 spanning time slot n+2 812c and time slot n+3 812d for eMBB data transmission, monitors the downlink communications resources 820 for PI instances 1103a and 1103b, i.e. from time t5 to t6 and from t9 to t10. According to the monitoring schedule, therefore, the first communications device 104a is not required to perform PI detection prior to time t5, after time t10, or between time t6 and t9.

Based on an $N_{PI}$ value of two OFDM symbols, and an $N_2$ value of ten OFDM symbols, the impact periods 1106a and 1106b corresponding to the PI instances 1103a and 1103b respectively may be determined.

As illustrated in FIG. 8, the first four OFDM symbols of each of the time slots n+2 812c and n+3 812d are not within either of the impact periods 1106a and 1106b. As a result, it may not be possible for the infrastructure equipment 101 to indicate to the first communications device 104a that pre-emption is to occur during these OFDM symbols. In other words if the infrastructure equipment 101 schedules the second communication device to transmit during these OFDM symbols, the infrastructure equipment is unable to use any of these PIs to inform the first communications device of this pre-emption.

In the example of FIG. 8, pre-emption does in fact occur from time t5 to t6, and from t10 to t11; that is, URLLC data is transmitted by the second communications device 104b using portions 1104a, 1104b of the communications resources 1105 which had been allocated for the eMBB data transmission by the first communications device 104a.

Because both instances of pre-emption fall outside of the impact periods 1106a, 1106b of any of the monitored PI instances 1103a, 1103b, the first communications device 104a could not modify in any way its transmission of the eMBB data. As a result, significant interference may result at the infrastructure equipment 101 and the probability of successfully receiving the URLLC data transmitted by the second communications device 104a may be unsatisfactory.

In order to avoid such a problem, then according to some embodiments of the present technique, the infrastructure equipment 101 may determine that pre-emption using the resources falling outside the impact periods 1106a, 1106b is not feasible, and may instead allocate to the second communications device 104b other communications resources which, while resulting in pre-emption of the transmission of the first communications device 104a, fall within the range of one or more impact periods associated with PI instances which are to be monitored by the first communications device 104a in accordance with the determined monitoring schedule.

This technique may result in an increase in latency for some transmissions by the second communications device 104b. Accordingly, in some embodiments, a modulation and coding scheme to be used for the URLLC data transmissions by the second communications device 104b may be adapted to provide a more robust encoding, and hence a reduced probability that the URLLC data will be unsuccessfully decoded by the infrastructure equipment 101 and require retransmission. The second communications device 104b may adapt the modulation and coding scheme in this manner in response to receiving an indication transmitted by the infrastructure equipment 101. The infrastructure equipment 101 may transmit the indication in response to determining that it is necessary to delay the transmissions of the URLLC data due to the monitoring schedule of the first communications device 104a.

In some embodiments, in order to reduce or avoid the interference that would affect the reception of the URLLC data if it were transmitted using the allocated resources 1104a, 1104b falling outside of the impact periods of the PI instances monitored by the first communications device 104a, then the first communications device 104a may adapt its eMBB transmission as follows:

The first communications device 104b may determine the impact periods associated with the PI instances which are to be monitored in accordance with the monitoring schedule. The first communications device 104a may, based on the determined impact periods, adapt its transmission power during the time periods falling outside of the impact periods to be lower (possibly to zero) than that used for the eMBB data transmission during the time periods falling within the impact periods. This may be done without determining whether in fact any pre-emption occurs during the time periods outside of the impact periods. In such embodiments, no additional latency may be incurred by the URLLC data, and the interference that would otherwise result from the pre-emption may be reduced or avoided.

Figure 9:
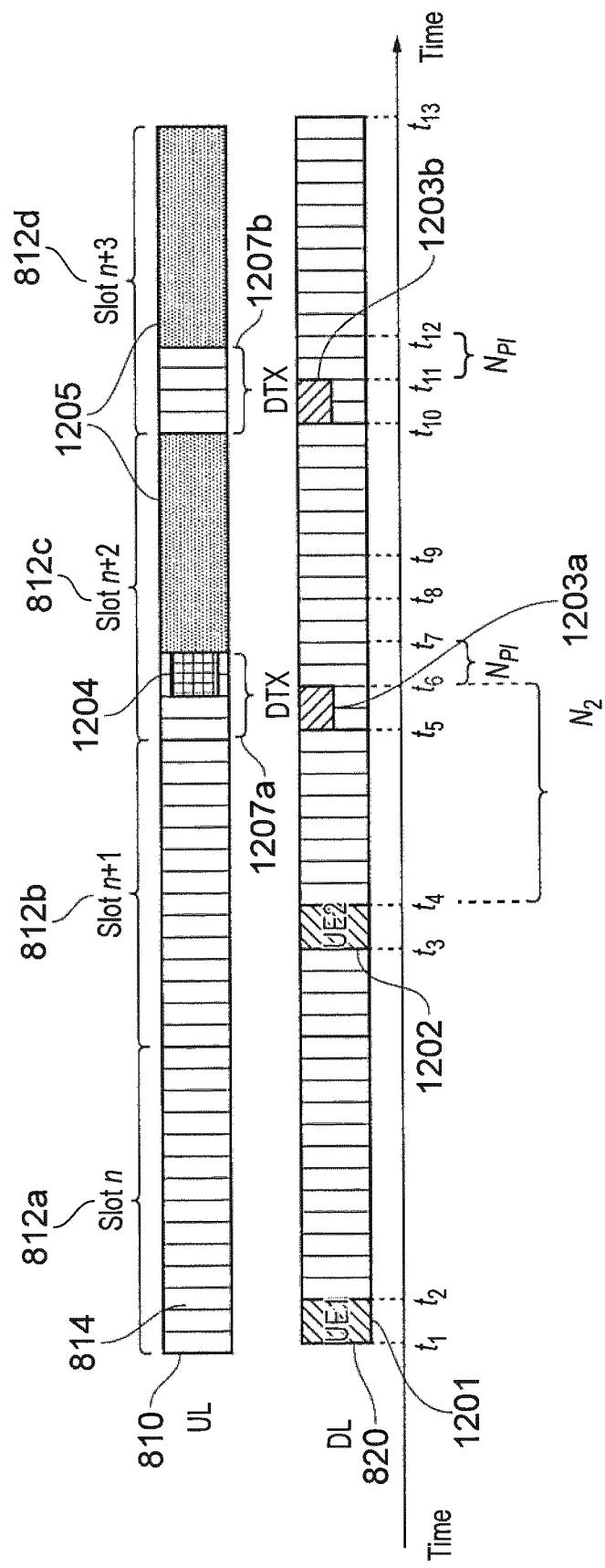
FIG. 9 illustrates an example whereby the transmission power of a communications device is reduced during time periods outside of determined impact periods, according to embodiments of the present disclosure.

FIG. 9 illustrates an example whereby the transmission power of the second communications device 104b is reduced to zero (in other words, discontinuous transmission, DTX, is used) during time periods outside the determined impact periods, according to embodiments of the present disclosure.

FIG. 9 broadly illustrates the same scenario as FIG. 8. However, in the example of FIG. 9, the first communications device 104a determines that the time periods 1207a from t5 to t7 and 1207b from t10 to t12 fall outside of any impact period associated with the PI instances 1203a, 1203b which are to be monitored in accordance with its monitoring schedule. Based on this determination, transmission of the eMBB data by the first communications device 104a is suspended during these 'non-impact' time periods 1207a, 1207b, as is illustrated by the absence of shading during these periods. As a result, the URLLC data transmission 1204 does not incur any interference due to the transmission of the eMBB data.

When DTX is applied to time periods which fall within the scope of allocated communications resources for the eMBB data transmission, but outside of any impact periods, then in some embodiments, transmissions of the eMBB data may be adapted by one or more of:

puncturing the eMBB data during the non-impact periods 1207a, 1207b;

applying rate matching to the eMBB data transmission, taking into account the use of DTX during the non-impact periods 1207a, 1207b; and refraining from transmitting demodulation reference symbols (DMRS) during the non-impact periods 1207a, 1207b.

In some embodiments, the monitoring schedule is determined such that any non-impact periods fall either at the beginning or end of the communications resources allocated for the eMBB transmission. In such embodiments, the monitoring schedule is such that impact periods of PI instances which are monitored according to the monitoring schedule collectively span a single contiguous time period within the time period during which resources are allocated for the eMBB data transmission.

In such techniques, there is thus no need for DTX or any modification of transmit power by the first communications device during the ongoing eMBB transmission which could result in a phase discontinuity of the eMBB data transmission.

Figure 10:
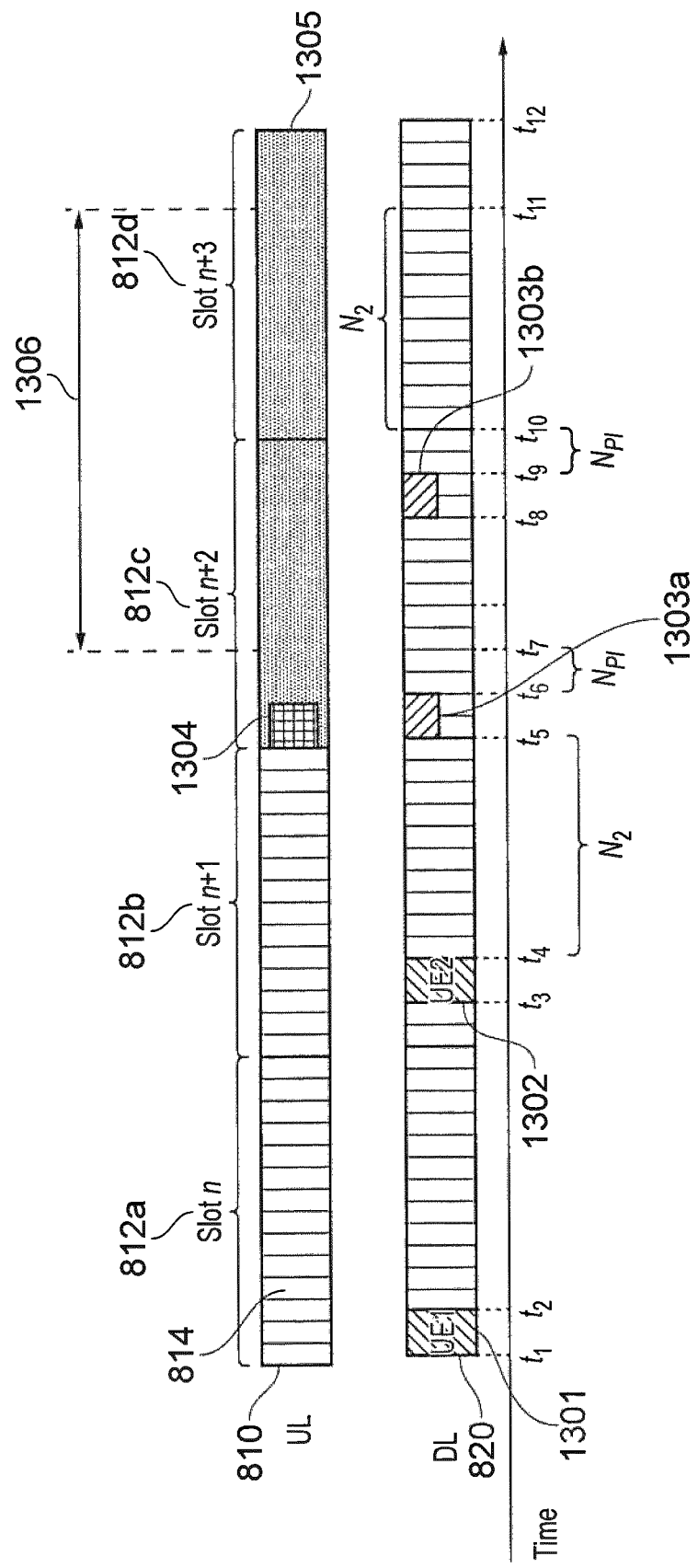
FIG. 10 illustrates an example of a monitoring schedule such that any non-impact periods fall either at the beginning or end of the communications resources allocated for the eMBB transmission, in accordance with example embodiments of the present disclosure.

FIG. 10 illustrates an example of a monitoring schedule such that any non-impact periods fall either at the beginning or end of the communications resources allocated for the eMBB transmission, in accordance with example embodiments of the present disclosure.

In the example of FIG. 10, the first communications device 104a is allocated communications resources 1305 extending from time t5 to t12 for the transmission of eMBB data. The monitoring schedule for the first communications device 104a requires it to monitor two PI instances 1303a, 1303b, from time t5 to t6, and from time t8 to t9 respectively.

The combined impact period 1306 of the two PI instances 1303a, 1303b extends from time t7 to t11 and is thus contiguous. Any DTX applied to the non-impact periods (i.e. prior to time t7 or after time t11) would therefore still maintain continuity of transmission of the eMBB data (i.e. the transmission of the eMBB data is contiguous between time t7 and time t11: the contiguity aids the UE RF in maintaining phase continuity of the eMBB transmission).

In some embodiments, the infrastructure equipment 101 may transmit an indication to the first communications device 104a to indicate whether and/or how transmission parameters (such as power, extent of puncturing, apply rate matching and/or modulation and coding scheme) used for the eMBB data transmission during the non-impact periods differ from those used during the impact periods. In some such embodiments, the indication may be transmitted as part of the indication of the grant of uplink communications resources 610 (broadly corresponding to uplink grant 1301 of FIG. 10).

In some embodiments, the communication device 104a determines the location of the non-impact periods in the scheduled uplink transmission based on the configured monitoring schedule of the UL PI. The UE uses different transmission parameters (such as power, extent of puncturing, apply rate matching and/or modulation and coding scheme) for the eMBB data transmission during the non-impact periods from those used during the impact periods, which may include discontinuous transmission (DTX).

In some embodiments, the gNB may command the eMBB UE to perform DTX, by signalling the eMBB UE, for example in an uplink grant message. In another embodiment the UE knows when to perform DTX based on the uplink PI configurations. The eMBB UE may therefore perform DTX based on the configurations of the uplink PI.

In some embodiments of the present technique, the pre-emption indicator 612 is specific to a particular communications device, such as the first communications device 104a.

The communications resources used for the transmission of the PI 612 may be specific to the first communications device 104a. In some embodiments, the PI 612 may be addressed to (i.e. for the use of) multiple communications devices. In embodiments where the PI 612 is addressed to a group of communications devices, then the PI 612 may be transmitted by means of downlink control information (DCI) using a radio network temporary identifier (RNTI) which is common to the group.

The communications resources used for the transmission of the PI 612 may be indicated in the first uplink allocation indication 610, i.e. the uplink grant which indicates the resources for eMBB transmission; the uplink grant may be transmitted in DCI.

In some embodiments of the present technique, the pre-emption indicator 612 consists of an encoded single bit of information which indicates to the first communications device 104a whether or not it is required to refrain from transmitting during some or all of the communications resources allocated for the eMBB transmission 616. In some embodiments, the encoded bit may be encoded by adding redundant information and/or coding bits.

In such embodiments, the probability of successful PI detection would be high and the complexity of decoding it would be low, such that the NPI value could be accordingly low.

In some embodiments, the PI 612 comprises downlink control information containing a single bit of information and a cyclic redundancy check sequence, which may have a length of 24 bits.

In some embodiments, the PI 612 comprises a predetermined sequence of bits, suitable for decoding by means of a correlator receiver, such as may be also used to decode a wake-up signal encoded in accordance with 3GPP Release 15 Wake-up signal specifications. The predetermined sequence may be specific to the first communications device 104a or specific to a group of communications devices.

In some embodiments the PI 612 is transmitted in downlink control information (DCI) having a size corresponding to a conventional DCI size. As described above, the DCI may comprise a single information bit, together with additional bits of coding and/or redundant bits to improve the reliability of the PI detection by the first communications device 104a.

In some embodiments, the PI 612 is transmitted as part of a slot format indicator which is transmitted at the beginning of each slot and is used to indicate the structure of the slot.

In some embodiments, the transmission by the infrastructure equipment 101 of the PI 612 indicates that pre-emption is to occur in respect of the eMBB transmission 616.

In some embodiments, the reliability of PI detection is improved by the first communications device 104a determining, prior to a PI instance, whether or not a PI is to be transmitted at that PI instance. For example, in some embodiments, a PI is transmitted at every PI instance of the monitoring schedule, and each PI indicates whether or not pre-emption is to occur.

In some embodiments, the infrastructure equipment 101 transmits to the first communications device 104a an indication which indicates whether either i) a PI is transmitted at every PI instance of the monitoring schedule, or ii) no PI is to be transmitted at any PI instance of the monitoring schedule. This indication may apply to a specific uplink transmission (such as the eMBB transmission 616), and in some embodiments, may be transmitted as part of the uplink grant 610 which allocates uplink communications resources for the eMBB transmission 616.

Figure 11:
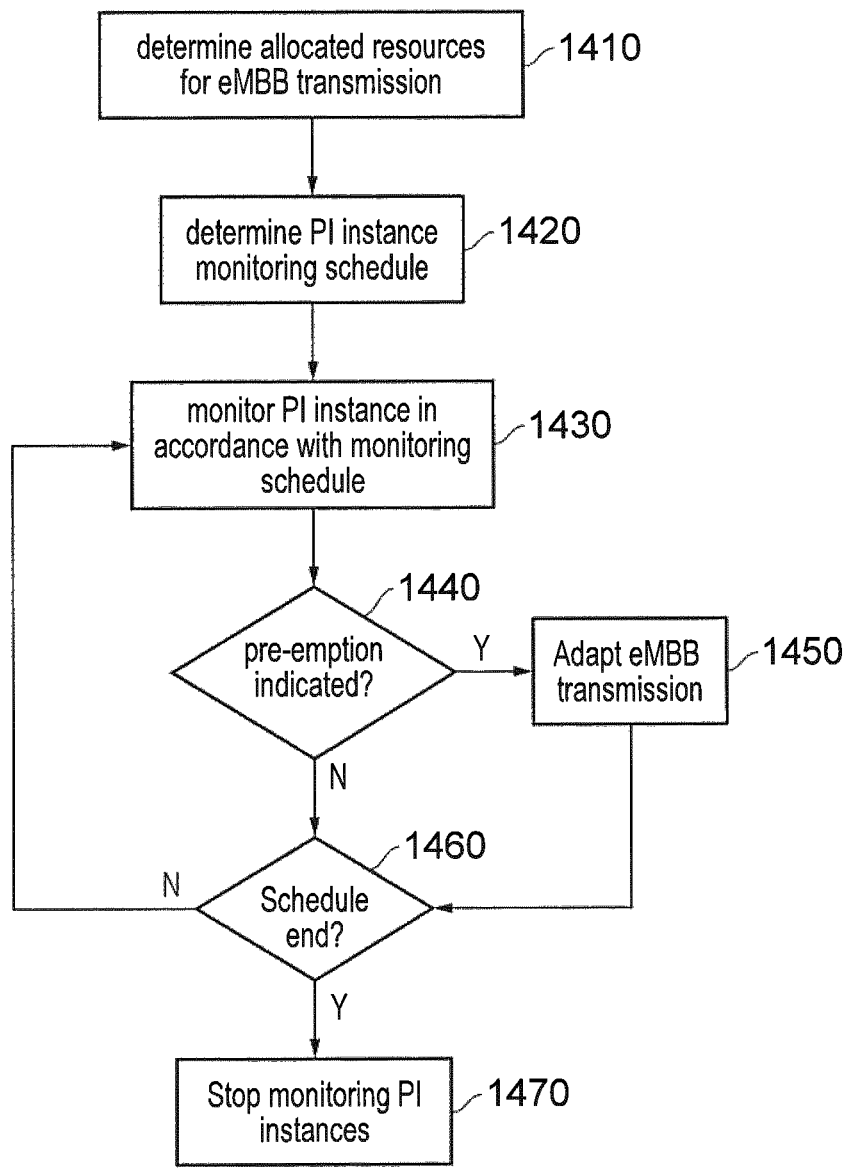
FIG. 11 illustrates a process flow chart for a communications device in accordance with embodiments of the present disclosure.

FIG. 11 illustrates a process flow chart for a communications device, such as the first communications device 104a, in accordance with embodiments of the present disclosure.

The process starts at step 1410, at which the first communications device 104a determines communications resources allocated for the transmission of uplink data, such as eMBB data. The determination may be in response to receiving an uplink grant, such as the first uplink allocation indication 610.

The process continues to step 1420, in which the first communications device 104a determines a monitoring schedule for monitoring PI instances (that is, times at which it must attempt to decode PIs). The monitoring schedule may be determined autonomously by the first communications device 104a, for example based on pre-configured parameters such as $N_2$, $N_{PI}$, $T_{PI}$, and $T_{DCI}$. Alternatively, one or more such parameters may be indicated in an indication transmitted by the infrastructure equipment 101 to the first communications device 104a.

Step 1420 may comprise determining, by the first communications device 104a, an impact period associated with each of one or more PI instances.

In some embodiments, the infrastructure equipment 101 determines one or more aspects of the monitoring schedule (for example, one or more of the monitoring start time, the monitoring end time, and the monitoring periodicity) and transmits an indication of these aspects of the monitoring schedule to the first communications device 104a, which thus determines the monitoring schedule based on the indication received from the infrastructure equipment.

As described above, in some embodiments, the uplink grant may indicate that no PI will be sent during the eMBB data transmission, in which case the first communications device 104a may determine that the monitoring schedule is empty.

Control then passes to step 1430, in which the first communications device 104a monitors the next PI instance in the monitoring schedule.

At step 1440, the communications device decodes signals received during the PI instance and determines whether or not pre-emption is to occur in respect of a portion or all of the eMBB transmission. If it is, then control passes to step 1450; if not, the process continues to step 1460.

At step 1450, the first communications device 104a may, in some embodiments, cease (or refrain from) transmitting any further eMBB data.

In other embodiments, in step 1450, the first communications device 104a determines a time period associated with the PI instance which it has most recently monitored in step 1440, and refrains from transmitting during the determined time period. In some embodiments, the time period is (at least) the impact period, as described above.

In other embodiments, the time period begins at the earliest possible time after the PI instance (and preferably no greater than $N_{PI}$ after the end of the PI instance), and continues until the start of the next PI instance, or, in some embodiments, the start of the impact period associated with the next PI instance.

In step 1460, the first communications device 104a determines whether it needs to monitor any further PI instances, in accordance with the monitoring schedule. In some embodiments, the first communications device 104a may determine, based on the contents of a PI, that no pre-emption will occur during the remainder of the eMBB transmission, and therefore that there is no need for the first communications device 104a to monitor any further PI instances, even if some remain scheduled according to the monitoring schedule determined at step 1420.

If there are more PI instances to be monitored, then control returns to step 1430; otherwise, control passes to step 1470 and the first communications device 104a refrains from monitoring further PI instances.

Embodiments of the present technique provide for a monitoring process determined in accordance with the allocated uplink communications resources for eMBB transmission, which may considerably reduce the complexity and processing requirements for communications devices which are required to monitor PI instances.

Although the foregoing description of embodiments of the present technique have been in the context of URLLC and eMBB data transmissions, the scope of the disclosure is not so limited, and it will be appreciated that the techniques disclosed herein may be applied to other types of transmissions.

Thus there has been described a communications device for use in a wireless communications network, the communications device comprising a transmitter configured to transmit signals representing data on communications resources of a wireless access interface of the wireless communications network, a receiver configured to receive signals representing control information, the control information indicating whether a portion of the communications resources are allocated for a transmission by another communications device and a controller configured to control the transmitter and the receiver so that the communications device is operable: to determine the communications resources of the wireless access interface for transmitting the signals representing the data, based on the determined communications resources, to determine a control information monitoring schedule, to detect and to decode the signals representing the control information in accordance with the control information monitoring schedule, and in accordance with the control information, to transmit the signals representing the data or to refrain from transmitting the signals representing the data.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A communications device for use in a wireless communications network, the communications device comprising
transmitter circuitry configured to transmit signals on communications resources of a wireless access interface of the wireless communications network,
receiver circuitry configured to receive signals transmitted on the communications resources of the wireless access interface, and
controller circuitry configured to control the transmitter and the receiver to transmit data representing the signals, the controller being configured
to determine communications resources of the wireless access interface to be used to transmit the signals representing the data to be transmitted, and
to determine a schedule for monitoring the wireless access interface to receive control information, wherein the monitoring schedule is based on the determined communications resources to be used to transmit the data, and the control information is monitored for a pre-emption indication that at least a portion of the determined communications resources are allocated for transmitting signals by another communications device.

Paragraph 2. A communications device according to paragraph 1, wherein the control information monitoring schedule comprises one or more of a monitoring start time, a monitoring periodicity and a monitoring end time.

Paragraph 3. A communications device according to paragraph 2, wherein the monitoring start time is determined based on a start time of the determined communications resources and a predetermined time corresponding to a predefined processing time for the control information.

Paragraph 4. A communications device according to paragraph 2 or paragraph 3, wherein the control information monitoring schedule comprises the monitoring end time, and the monitoring end time is determined based on an end time of the determined communications resources and a predetermined time corresponding to a predefined processing time for control information indicating a grant of communications resources.

Paragraph 5. A communications device according to any of paragraphs 2 to 4, wherein the control information monitoring schedule comprises the monitoring periodicity, and the monitoring periodicity is determined based on one or more of the predetermined time corresponding to the predefined processing time for control information indicating a grant of communications resources and the predetermined time corresponding to the predefined processing time for the control information.

Paragraph 6. A communications device according to any of paragraphs 2 to 5, wherein the controller circuitry is configured to control the transmitter and the receiver so that the communications device is operable
to receive an indication of one or more of the monitoring start time, the monitoring periodicity and the monitoring end time.

Paragraph 7. A communications device according to any of paragraphs 1 to 6, wherein
the control information monitoring schedule identifies a plurality of instances of the control information, and
the controller is configured to control the transmitter and the receiver so that the communications device is operable:
to determine that an instance of the control information indicates that a portion of the determined communications resources are allocated for a transmission by another communications device, and
in response to determining that the instance of the control information indicates that a portion of the determined communications resources are allocated for a transmission by another communications device, to determine the corresponding portion of the determined communications resources.

Paragraph 8. A communications device according to paragraph 7, wherein the corresponding portion of the determined communications resources is determined based on one or more of the control information monitoring schedule, the predetermined time corresponding to the minimum processing time for the control information and the predetermined time corresponding to the minimum processing time for control information indicating a grant of communications resources.

Paragraph 9. A communications device according to paragraph 7 or 8, wherein, the controller circuitry is configured to control the transmitter circuitry and the receiver circuitry so that the communications device is operable:
to receive and to decode the signals representing the control information in accordance with the control information monitoring schedule, and
in accordance with the control information, to transmit the signals representing the data or to refrain from transmitting the signals representing the data by refraining from transmitting during at least the corresponding portion of the determined communications resource.

Paragraph 10. A communications device according to any of paragraphs 1 to 9, wherein the controller circuitry is configured to control the transmitter circuitry and the receiver circuitry so that the communications device is operable:
to receive an indication of the communications resources of the wireless access interface for transmitting the signals representing the data, and
the communications resources are on a shared uplink channel of the wireless access interface.

Paragraph 11. An infrastructure equipment for use in a wireless communications network, the infrastructure equipment comprising
transmitter circuitry configured to transmit signals via a wireless access interface provided by the wireless communications network,
receiver circuitry configured to receive signals representing data transmitted via the wireless access interface of the wireless communications network, and
controller circuitry configured to control the transmitter circuitry and the receiver circuitry so that the infrastructure equipment is operable
to determine first communications resources of the wireless access interface for receiving the signals representing first data from a first communications device,
based on the first communications resources, to determine a control information monitoring schedule for the first communications device, the monitoring schedule being based on the determined first communications resources to be used to receive the first data, and the control information providing a preemption indication that at least a portion of the first communications resources are allocated for transmitting signals by another communications device.

Paragraph 12. An infrastructure equipment according to paragraph 11, wherein the control information monitoring schedule comprises one or more of a monitoring start time, a monitoring periodicity and a monitoring end time.

Paragraph 13. An infrastructure equipment according to paragraph 12, wherein the control information monitoring schedule comprises the monitoring start time, and the monitoring start time is determined based on a start time of the first communications resources and a predetermined time corresponding to a predefined processing time for the control information.

Paragraph 14. An infrastructure equipment according to paragraph 12 or paragraph 13, wherein the control information monitoring schedule comprises the monitoring end time, and the monitoring end time is determined based on an end time of the first communications resources and a predetermined time corresponding to a predefined processing time for control information indicating a grant of communications resources.

Paragraph 15. An infrastructure equipment according to any of paragraphs 12 to 14, wherein the control information monitoring schedule comprises the monitoring periodicity, and the monitoring periodicity is determined based on one or more of the predetermined time corresponding to the minimum processing time for control information indicating a grant of communications resources and the predetermined time corresponding to the minimum processing time for the control information.

Paragraph 16. An infrastructure equipment according to any of paragraphs 11 to 15, wherein controller circuitry is configured to determine second communications resources of the wireless access interface for receiving signals representing second data from a second communications device, the second communications resources comprising at least a portion of the first communications resources, and to control the receiver circuitry to receive the control information in accordance with the determined control information monitoring schedule, the control information indicating that at least a portion of the first communications resources have been allocated for receiving signals by the second communications device.

Paragraph 17. A method of operating a communications device to transmit data in a wireless communications network, the method comprising determining communications resources of a wireless access interface provided by the wireless communications network to be used to transmit the signals representing the data to be transmitted, and determining a schedule for monitoring the wireless access interface to receive control information, wherein the monitoring schedule is based on the determined communications resources to be used to transmit the data, and the control information is monitored for a pre-emption indication that at least a portion of the determined communications resources are allocated for transmitting signals by another communications device.

Paragraph 18. A method according to paragraph 17, wherein the control information monitoring schedule comprises one or more of a monitoring start time, a monitoring periodicity and a monitoring end time.

Paragraph 19. A method according to paragraph 17 or 18, the method comprising transmitting signals on the communications resources of the wireless access interface to transmit the data, detecting the control information providing a pre-emption indication according to the monitoring schedule, and adapting the transmitting of the signals representing data in accordance with the pre-emption indication.

Paragraph 20. A method of operating infrastructure equipment for use in a wireless communications network, the method comprising determining communications resources of the wireless access interface for receiving signals representing data, based on the determined communications resources, determining a schedule for monitoring for control information providing a pre-emption indication, the monitoring schedule being based on the determined communications resources to be used to receive the data, wherein the pre-emption indication indicates that at least a portion of the communications resources are allocated for receiving other signals.

Paragraph 21. A method according to paragraph 20, wherein the control information monitoring schedule comprises one or more of a monitoring start time, a monitoring periodicity and a monitoring end time.

Paragraph 22. A method according to paragraph 20 or 21, the method comprising receiving signals on the communications resources of the wireless access interface to receive the data, transmitting the control information providing the pre-emption indication according to the monitoring schedule, and adapting the other signals representing other data in accordance with the pre-emption indication.

Paragraph 23. Circuitry for use in a wireless communications network, the circuitry comprising transmitter circuitry configured to transmit signals on communications resources of a wireless access interface of the wireless communications network, receiver circuitry configured to receive signals transmitted on the communications resources of the wireless access interface, and controller circuitry configured to control the transmitter and the receiver to transmit data representing the signals, the controller being configured to determine communications resources of the wireless access interface to be used to transmit the signals representing the data to be transmitted, and to determine a schedule for monitoring the wireless access interface to receive control information, wherein the monitoring schedule is based on the determined communications resources to be used to transmit the data, and the control information is monitored for a pre-emption indication that at least a portion of the determined communications resources are allocated for transmitting signals by another communications device.

Paragraph 24. Circuitry for use in a wireless communications network, the circuitry comprising transmitter circuitry configured to transmit signals via a wireless access interface provided by the wireless communications network, receiver circuitry configured to receive signals representing data transmitted via the wireless access interface of the wireless communications network, and controller circuitry configured to control the transmitter circuitry and the receiver circuitry so that the infrastructure equipment is operable to determine first communications resources of the wireless access interface for receiving the signals representing first data from a first communications device, based on the first communications resources, to determine a control information monitoring schedule for the first communications device, the monitoring schedule being based on the determined first communications resources to be used to receive the first data, and the control information providing a pre-emption indication that at least a portion of the first communications resources are allocated for transmitting signals by another communications device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2(Release 15)", June 2018
[2] Holma H. and Toskala A, "LTE for UMTS OFDMA and SC-FDMA based radio access", John Wiley and Sons, 2009
[3] TR 38.913, "Study on Scenarios and Requirements for Next Generation Access Technologies (Release 14)".

What is claimed is:

1. A communications device for use in a wireless communications network, the communications device comprising
   transmitter circuitry configured to transmit signals on communications resources of a wireless access interface of the wireless communications network,
   receiver circuitry configured to receive signals transmitted on the communications resources of the wireless access interface, and
   controller circuitry configured to control the transmitter and the receiver to transmit data representing the signals, the controller being configured
   to determine communications resources of the wireless access interface to be used to transmit the signals representing the data to be transmitted, and
   to determine a schedule for monitoring the wireless access interface to receive control information, wherein the monitoring schedule is based on the determined communications resources to be used to transmit the data, and the control information is monitored for a pre-emption indication that at least a portion of the determined communications resources are allocated for transmitting signals by another communications device.

2. The communications device according to claim 1, wherein the control information monitoring schedule comprises one or more of a monitoring start time, a monitoring periodicity and a monitoring end time.

3. The communications device according to claim 2, wherein the monitoring start time is determined based on a start time of the determined communications resources and a predetermined time corresponding to a predefined processing time for the control information.

4. The communications device according to claim 2, wherein the control information monitoring schedule comprises the monitoring end time, and the monitoring end time is determined based on an end time of the determined communications resources and a predetermined time corresponding to a predefined processing time for control information indicating a grant of communications resources.

5. The communications device according to claim 2, wherein the control information monitoring schedule comprises the monitoring periodicity, and the monitoring periodicity is determined based on one or more of the predetermined time corresponding to the predefined processing time for control information indicating a grant of communications resources and the predetermined time corresponding to the predefined processing time for the control information.

6. The communications device according to claim 2, wherein the controller circuitry is configured to control the transmitter and the receiver so that the communications device is operable
   to receive an indication of one or more of the monitoring start time, the monitoring periodicity and the monitoring end time.

7. The communications device according to claim 1, wherein
   the control information monitoring schedule identifies a plurality of instances of the control information, and
   the controller is configured to control the transmitter and the receiver so that the communications device is operable:
   to determine that an instance of the control information indicates that a portion of the determined communications resources are allocated for a transmission by another communications device, and
   in response to determining that the instance of the control information indicates that a portion of the determined communications resources are allocated for a transmission by another communications device, to determine the corresponding portion of the determined communications resources.

8. The communications device according to claim 7, wherein the corresponding portion of the determined communications resources is determined based on one or more of the control information monitoring schedule, the predetermined time corresponding to the minimum processing time for the control information and the predetermined time corresponding to the minimum processing time for control information indicating a grant of communications resources.

9. The communications device according to claim 7, wherein, the controller circuitry is configured to control the transmitter circuitry and the receiver circuitry so that the communications device is operable:
   to receive and to decode the signals representing the control information in accordance with the control information monitoring schedule, and
   in accordance with the control information, to transmit the signals representing the data or to refrain from transmitting the signals representing the data by refraining from transmitting during at least the corresponding portion of the determined communications resource.

10. The communications device according to claim 1, wherein the controller circuitry is configured to control the transmitter circuitry and the receiver circuitry so that the communications device is operable:
    to receive an indication of the communications resources of the wireless access interface for transmitting the signals representing the data, and
    the communications resources are on a shared uplink channel of the wireless access interface.

11. An infrastructure equipment for use in a wireless communications network, the infrastructure equipment comprising
    transmitter circuitry configured to transmit signals via a wireless access interface provided by the wireless communications network,
    receiver circuitry configured to receive signals representing data transmitted via the wireless access interface of the wireless communications network, and
    controller circuitry configured to control the transmitter circuitry and the receiver circuitry so that the infrastructure equipment is operable
    to determine first communications resources of the wireless access interface for receiving the signals representing first data from a first communications device,
    based on the first communications resources, to determine a control information monitoring schedule for the first communications device, the monitoring schedule being based on the determined first communications resources to be used to receive the first data, and the control information providing a pre-emption indication that at least a portion of the first communications resources are allocated for receiving signals from another communications device.

12. The infrastructure equipment according to claim 11, wherein the control information monitoring schedule comprises one or more of a monitoring start time, a monitoring periodicity and a monitoring end time.

13. The infrastructure equipment according to claim 12, wherein the control information monitoring schedule comprises the monitoring start time, and the monitoring start time is determined based on a start time of the first communications resources and a predetermined time corresponding to a predefined processing time for the control information.

14. The infrastructure equipment according to claim 12, wherein the control information monitoring schedule comprises the monitoring end time, and the monitoring end time is determined based on an end time of the first communications resources and a predetermined time corresponding to a predefined processing time for control information indicating a grant of communications resources.

15. The infrastructure equipment according to claim 12, wherein the control information monitoring schedule comprises the monitoring periodicity, and the monitoring periodicity is determined based on one or more of the predetermined time corresponding to the minimum processing time for control information indicating a grant of communications resources and the predetermined time corresponding to the minimum processing time for the control information.

16. The infrastructure equipment according to claim 11, wherein controller circuitry is configured
to determine second communications resources of the wireless access interface for receiving signals representing second data from a second communications device, the second communications resources comprising at least a portion of the first communications resources, and
to control the transmitter circuitry to transmit the control information in accordance with the determined control information monitoring schedule, the control information indicating that at least a portion of the first communications resources have been allocated for receiving signals by the second communications device.

17. A method of operating a communications device to transmit data in a wireless communications network, the method comprising
determining communications resources of a wireless access interface provided by the wireless communications network to be used to transmit the signals representing the data to be transmitted, and
determining a schedule for monitoring the wireless access interface to receive control information, wherein the monitoring schedule is based on the determined communications resources to be used to transmit the data, and the control information is monitored for a pre-emption indication that at least a portion of the determined communications resources are allocated for transmitting signals by another communications device.

18. The method according to claim 17, wherein the control information monitoring schedule comprises one or more of a monitoring start time, a monitoring periodicity and a monitoring end time.

19. The method according to claim 17, the method comprising
transmitting signals on the communications resources of the wireless access interface to transmit the data,
detecting the control information providing a pre-emption indication according to the monitoring schedule, and
adapting the transmitting of the signals representing data in accordance with the pre-emption indication.

* * * * *